United States Patent
Sharrow

(10) Patent No.: US 11,603,184 B2
(45) Date of Patent: Mar. 14, 2023

(54) PROPELLER

(71) Applicant: Sharrow Engineering LLC, Philadelphia, PA (US)

(72) Inventor: Gregory Charles Sharrow, Cherry Hill, NJ (US)

(73) Assignee: Sharrow Engineering LLC

(*) Notice: Subject to any disclaimer, the term of this patent is extended or adjusted under 35 U.S.C. 154(b) by 0 days.

(21) Appl. No.: 15/956,303

(22) Filed: Apr. 18, 2018

(65) Prior Publication Data

US 2018/0237122 A1     Aug. 23, 2018

Related U.S. Application Data

(63) Continuation of application No. 13/843,344, filed on Mar. 15, 2013, now abandoned.

(60) Provisional application No. 61/735,140, filed on Dec. 10, 2012.

(51) Int. Cl.
| | |
|---|---|
| *B64C 11/00* | (2006.01) |
| *B63H 1/26* | (2006.01) |
| *B64C 11/16* | (2006.01) |
| *F01D 5/14* | (2006.01) |

(52) U.S. Cl.
CPC .............. *B64C 11/00* (2013.01); *B63H 1/265* (2013.01); *B64C 11/16* (2013.01); *F01D 5/14* (2013.01); *F01D 5/141* (2013.01); *Y02E 10/72* (2013.01); *Y10T 29/49332* (2015.01)

(58) Field of Classification Search
CPC ........ F04D 29/26; F04D 29/32; F04D 29/325; F04D 29/38; F04D 29/384; F04D 29/388; F04D 29/34; F04D 29/382; B64C 11/00; B64C 11/16; B63H 1/265; F01D 5/14; F01D 5/141; Y02E 10/72; Y10T 29/49332
USPC ......................................... 416/227 R, 227 A
See application file for complete search history.

(56) References Cited

U.S. PATENT DOCUMENTS

| | | | |
|---|---|---|---|
| 467,322 A | 1/1892 | Myers | |
| 467,323 A | 1/1892 | Myers | |
| 680,671 A * | 8/1901 | Brewster | A47J 43/0711 416/227 R |
| 868,220 A * | 10/1907 | Portelli | A47J 43/0711 416/227 R |

(Continued)

FOREIGN PATENT DOCUMENTS

| | | |
|---|---|---|
| EP | 1365106 A1 | 11/2003 |
| GB | 427493 A | 4/1935 |

(Continued)

OTHER PUBLICATIONS

Fourth Notification of Examiner Opinion issued in Chinese Patent Application 201380063211.3 by the State Intellectual Property Office of China dated Mar. 27, 2019.

(Continued)

*Primary Examiner* — Bryan M Lettman
(74) *Attorney, Agent, or Firm* — Barnes & Thornburg LLP; Joan Taft Kluger

(57) ABSTRACT

A propeller having a central post to which one or more blades are connected. The blades are disposed and configured to pull air in from the propeller's sides toward the propeller's axis of rotation to create pressure in an area in the vicinity of the center of the propeller's rotating axis for generating thrust.

15 Claims, 10 Drawing Sheets

(56) References Cited

U.S. PATENT DOCUMENTS

| | | | | | |
|---|---|---|---|---|---|
| 917,217 | A | * | 4/1909 | Weston | F04D 29/382 |
| | | | | | 416/227 R |
| 1,868,113 | A | * | 7/1932 | Ljungstrom | F04D 29/382 |
| | | | | | 415/217.1 |
| 2,045,383 | A | | 6/1936 | Faber | |
| 2,273,756 | A | * | 2/1942 | Hoenrkamp | F04D 29/325 |
| | | | | | 416/227 R |
| 2,344,266 | A | | 8/1947 | Lyman | |
| 2,473,665 | A | | 6/1949 | Van Nort | |
| 3,087,553 | A | | 4/1963 | Kostyun | |
| 3,485,462 | A | | 12/1969 | Spence | |
| 5,111,576 | A | * | 5/1992 | Kuhnle | F42B 10/58 |
| | | | | | 29/889.23 |
| 5,405,246 | A | * | 4/1995 | Goldberg | F03D 80/40 |
| | | | | | 416/DIG. 8 |
| 6,099,256 | A | | 8/2000 | Silvano | |
| 6,948,910 | B2 | * | 9/2005 | Polacsek | F03D 1/0608 |
| | | | | | 416/227 R |
| 7,018,167 | B2 | * | 3/2006 | Yoshida | F04D 29/384 |
| | | | | | 415/4.5 |
| 2004/0009063 | A1 | | 1/2004 | Polacsek | |
| 2004/0067138 | A1 | | 8/2004 | Yoshida | |
| 2008/0075599 | A1 | * | 3/2008 | Miller | F03D 1/0608 |
| | | | | | 416/182 |
| 2011/0299991 | A1 | * | 12/2011 | Shpadi | B63H 1/265 |
| | | | | | 416/223 R |
| 2012/0056041 | A1 | | 3/2012 | Rhee | |
| 2012/0288374 | A1 | * | 11/2012 | Avellan | B63H 1/265 |
| | | | | | 416/223 R |
| 2014/0161622 | A1 | | 6/2014 | Sharrow | |
| 2015/0037157 | A1 | | 2/2015 | Tzeng | |

FOREIGN PATENT DOCUMENTS

| | | |
|---|---|---|
| JP | 2003503643 | 1/2003 |
| RU | 2585180 C1 | 5/2016 |
| WO | 2002059464 A1 | 8/2002 |
| WO | 2011081577 A1 | 7/2011 |

OTHER PUBLICATIONS

Fifth Notification of Examiner Opinion issued in Chinese Patent Application 201380063211.3 by the State Intellectual Property Office of China dated May 30, 2019.
Examination Search Report issued in Canadian Patent Application 3000830 by the Canadian Intellectual Property Office dated May 1, 2018.
First Office Action issued by the State Intellectual Property Office in Chinese Patent Application 201780003480.9 dated Jan. 2, 2019.
Final Office Action issued in U.S. Appl. No. 13/843,344 dated Oct. 19, 2017.
International Search Report and Written Opinion issued in International Patent Application PCT/US2017/034558 dated Aug. 29, 2017.
Office Action of the Intellectual Property Office issued in ROC (Taiwan) Patent Application. No. 106207667 dated Jan. 24, 2018.
Final Office Action issued in U.S. Appl. No. 15/489,562 dated Jun. 15, 2018.
Non-final Office Action issued in U.S. Appl. No. 15/489,562 dated Nov. 2, 2017.
Office Action of the Intellectual Property Office issued in ROC (Taiwan) Patent Application. No. 106207667 dated Apr. 24, 2018.
State Intellectual Property Office of China Decision to Reject issued in Chinese Application 201380063211.3 dated Dec. 17, 2017.
Extended Supplementary Search Report issued in European Patent Application 17803624.0 dated Sep. 18, 2019.
Article: "Bionik fur die maritime Wirtschaft" by Ingo Klein issued in Offshore & Meerestechnik Kompakt, Schiff & Hafen, Seehafen Verlag GMBH, DE, vol. 59 No. 3, Jan. 1, 2007, p. 90-91, XP001542137, ISSN: 1436-8498.
Third Notification of Examiner Opinion in Chinese Patent Application 201380063211.3 issued by the State Intellectual Property Office of China dated Jan. 26, 2017.
Notification of Re-examination of Chinese Application 201380063211.3 issued by the State Intellectual Property Office of China dated Sep. 29, 2018.
Non-Final Office Action issued in U.S. Appl. No. 13/843,344 dated Apr. 7, 2017.
Extended European Search Report dated Oct. 22, 2018 by the European Patent Office for European Patent Application No. 18191741.0.
Office Action of the Intellectual Property Office dated Nov. 1, 2018 for ROC (Taiwan) Patent Application. No. 106117755.
Non Final Office Action dated Aug. 5, 2019 in U.S. Appl. No. 15/897,767.
First Examination Report dated Dec. 21, 2018 issued in Australian Patent Application No. 2017268808.
Examiner Report No. 1 and Search Report issued in Chilean Patent Application 3300-2018 by the Patent Office of Chile dated Feb. 25, 2020.
First Examination Report issued in India Patent Application 201817048599 by the India Patent Office dated Jun. 1, 2020.
Examination Report No. 1 issued in Australian Patent Application 2019203301 by the Australian Patent Office dated Jun. 5, 2020.
Office Action dated Aug. 25, 2020 issued in Japanese Patent Application No. 2018-520417.
Article "Integrated Design and Realization of a Hubless Rim-driven Thruster", Min-Fu Hsieh et al., Department of Systems and Naval Mechantronic Engineering, National Chen Kung University; The 33rd Annual Conference of the IEEE Industrial Electronics Society (IECON) Nov. 5-8, 2007, Taipei, Taiwan.
Article "The Characteristics of Rim-Driven Propulsor's Flow Field", Chung-Wei Lee et al., Department of Systems and Naval Mechantronic Engineering, National Chen Kung University, Taiwan (2011 or earlier).
Search Report issued in Russia Patent Application No. 2018145854 dated Jun. 26, 2020.
European Search Report issued in European Patent Application No. 21174055.0 dated Jul. 28, 2021.
Klein I: "Bionik Fuer Die Maritime Wirtschaft", Shiff Und Hafen, Seehafen Verlag GMBH, DE, vol. 59, No. 3, Jan. 1, 2007.
Office action issued in Japanese Patent Application No. 2018-520517 dated Jul. 28, 2021.
Substantive Examination Report issued in Philippine Patent Application No. 1/2018/502468 and dated Aug. 31, 2021.

* cited by examiner

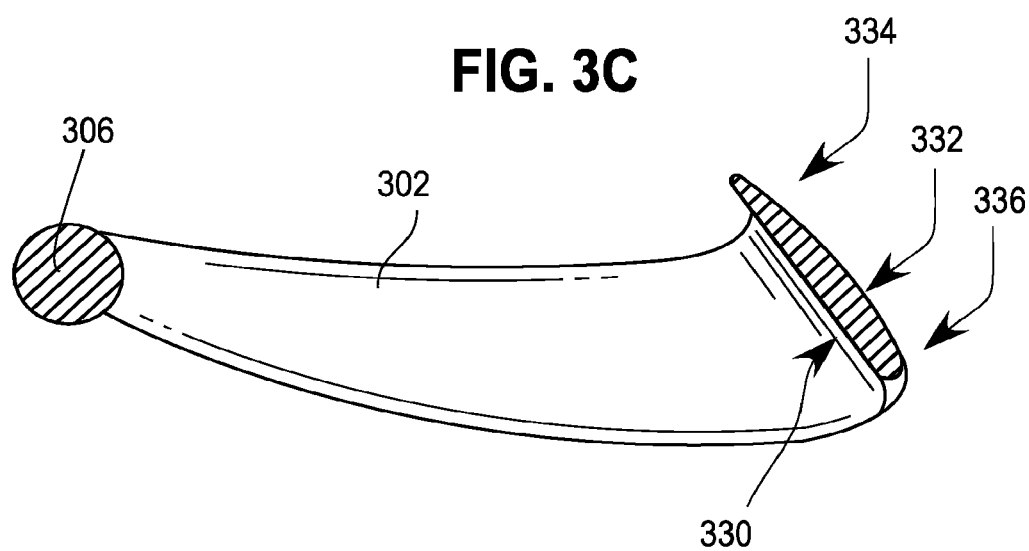
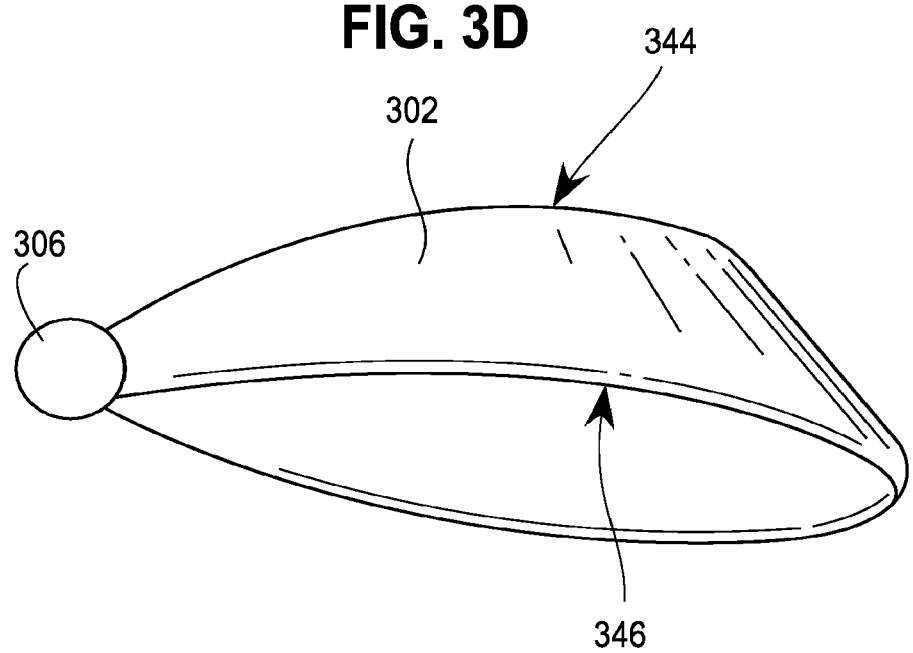

PROPELLER

CROSS-REFERENCE TO RELATED APPLICATIONS

This application is a continuation of U.S. patent application Ser. No. 13/843,344, filed on Mar. 15, 2013, which claims priority to U.S. Provisional Application 61/735,140, filed Dec. 10, 2012, both of which are entitled Propeller. The aforementioned patent applications are incorporated herein by reference.

BACKGROUND OF THE INVENTION

This invention relates to blade apparatuses such as propellers.

Typically, propellers have been used in devices such as aircraft, watercraft, turbines, and other like apparatuses in a wide variety of configurations for transmitting power by converting rotational motion into thrust or fluid flow.

A propeller generally consists of two or more blades attached to a central post or hub with the blades curved, twisted, or otherwise shaped to generate a pressure difference between the forward and rear surfaces of a blade to propel a fluid, such as water or air, past the blades. The shape, the pitch, and the twist of the blade all factor in the working efficiency of the propeller.

There have been numerous attempts at increasing propeller performance by altering blade designs. Such approaches have been successful to a degree but often result in propellers with limiting properties such as limited achievable rake and pitch. There is a need to provide a propeller that exhibits improved properties compared to conventional propellers.

SUMMARY

Embodiments of the invention provide a propeller that pulls air inward from the blade's side sections toward the propeller's axis of rotation and from the propeller's front to its back. The propeller has a central post coincident with a rotational axis and one or more blades disposed around the central axis. Each blade has a distal end and a proximate end. The blades include a top section, a bottom section, and a side section, with the side section disposed at or toward the distal end. The top section and bottom section of the one or more blades are connected at their proximate ends to, and extend radially outward from, the central post. There is a gap between the central post connections of the top section and bottom section of blades wherein air is compressed upon rotation of the propeller. The blade top portion intersects the central post at a blade top portion angle of intersection and the blade bottom portion intersects the central post at a blade bottom portion angle of intersection. As measured from a line perpendicular to the longitudinal axis of the propeller, the blade bottom portion angle of intersection is greater than the blade top portion angle of intersection. The top blade portion can be non-symmetrical with the bottom blade portion.

The propeller blades can be in loop form, wherein each of the blades in loop form spins in the same plane of rotation. At least one of the blade sections can exhibit a non-zero blade angle. The cross section of the blades can have an airfoil shape. Blades can be wider at their distal end as compared to their proximate end. Blades have a median line that can be straight or curved, independent of twists in the blade.

The propeller can have one or more pairs of blades opposing one another about the rotational axis. The pair of opposing blades can form a single, contiguous loop. The angles of intersection with respect to the rotational axis can be different between the opposing blades.

Propellers can be stacked on top of one another with or without spaces therebetween. Further, propellers can be comprised of a plurality of blades disposed in a helix about the central post.

The propeller blades can have a coarse pitch in the vicinity of the axis of rotation and decreasing pitch extending radially outward from the axis of rotation. Side sections of the blades exhibit a non-zero pitch.

The invention also includes devices having any of the disclosed propellers.

The invention further comprises a method of manufacturing a propeller comprising: selecting a desired direction of airflow, selecting a desired quantity of thrust, and selecting a blade curvature, combination of blades and blade intersection angles to create the selected airflow and thrust.

DESCRIPTION OF THE DRAWINGS

For further detail regarding illustrative embodiments of the invention, reference is made to the detailed description provided below, in conjunction with the following illustrations:

FIGS. 3B and 3C are alternative cross-sectional views of the blade shown in FIG. 3A according to illustrative embodiments of the invention.

FIGS. 3D and 3E are alternative views of the blade shown in FIG. 3 according to an illustrative embodiment of the invention.

DETAILED DESCRIPTION OF THE INVENTION

Generally, the invention comprises a propeller having one or more "blades" wherein the blades are shaped to create an air flow inward from the propeller sides toward the axis of rotation, for example in a plane perpendicular to the axis of rotation, and also to create airflow in the longitudinal direction of the rotational axis, such as from "front" to "back" of the propeller. The blades are shaped so that air is pulled inward by the blades' outer portions, or "supports", and compressed in the vicinity of the propeller's center. Consequently, as the propeller spins, the blades create pressure in the central area, which, in turn, results in greater thrust. Conversely, when spinning in the opposite direction of rotation, the propeller will create reverse thrust. In illustrative embodiments of the invention, the amount of reverse thrust may not equal the amount of thrust generated.

The term "blade" is used herein merely to designate a component that rotates about an axis to generate a desired airflow, and is not intended to denote a specific shape, such as flat.

Figure 1:
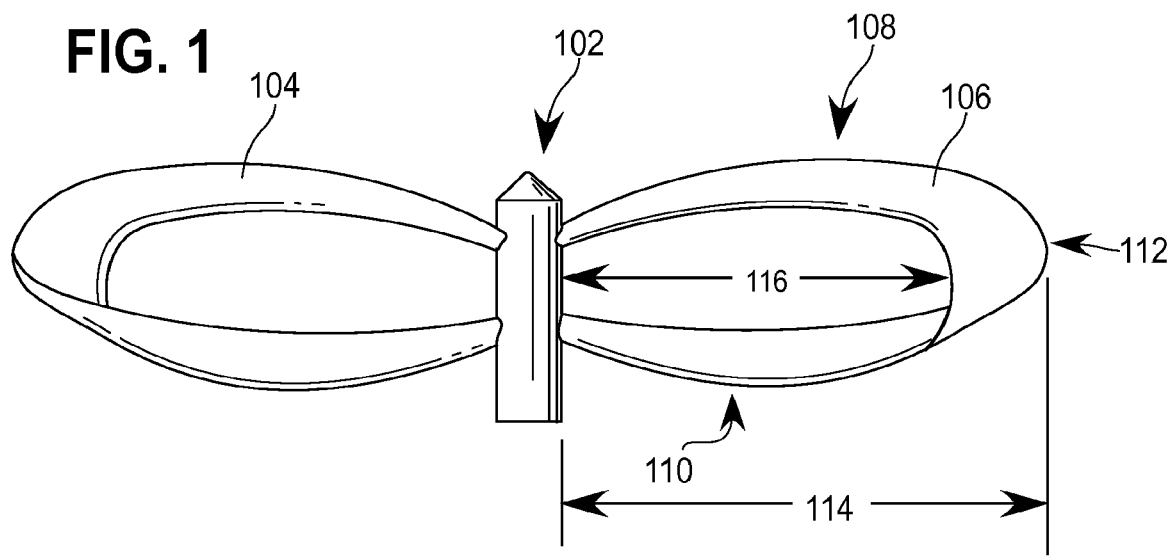
FIG. 1 is a side view of a schematic representative of a propeller according to an illustrative embodiment of the invention.

In illustrative embodiments of the invention, the blade includes three sections: top, bottom, and side. As a propeller can be disposed at various angles, an example of the use of the terms is shown in FIG. 1, and it is noted that, for example, if a propeller 102 is rotating in a vertical plane "top" and "bottom" may not correlate with the traditional meaning of those terms. Propeller 102 has two blades 104, 106. Blade 106 has a top section 108, a bottom section 110 opposing top section 108, and a side section 112. Side section 112 is at a distal end of top section 108 and connects top section 108 with bottom section 110. In this particular embodiment, side section 112 is a general area of the blade between the top section and the bottom section. In other embodiments, a blade's side section can be a discrete portion of the blade such as the side section 516 in FIG. 5.

The term "blade angle", measured in degrees, when used herein is defined as the angle between a lateral cross section of a blade and the plane of rotation. The term "pitch" is used herein interchangeably with "blade angle." Embodiments of the invention provide blades having at least one section exhibiting a non-zero blade angle.

The term "front" when used with respect to a propeller designates the side/face of the propeller, which when viewed will show counter clockwise motion of the propeller. The propeller "back" will be the opposing side. As the propeller spins, the direction of airflow will preferably be from front to back.

In illustrative embodiments of the invention, the length 114 from the central post to the distal end of the blade's leading edge is greater than the length 116 from the central post to the distal end of the blade's trailing edge. This decrease in blade length from the length at the blade's leading distal edge to the length at the blade's trailing distal edge can result in greater compression of air and greater thrust as compared to a comparable propeller design without this feature.

Figure 2:
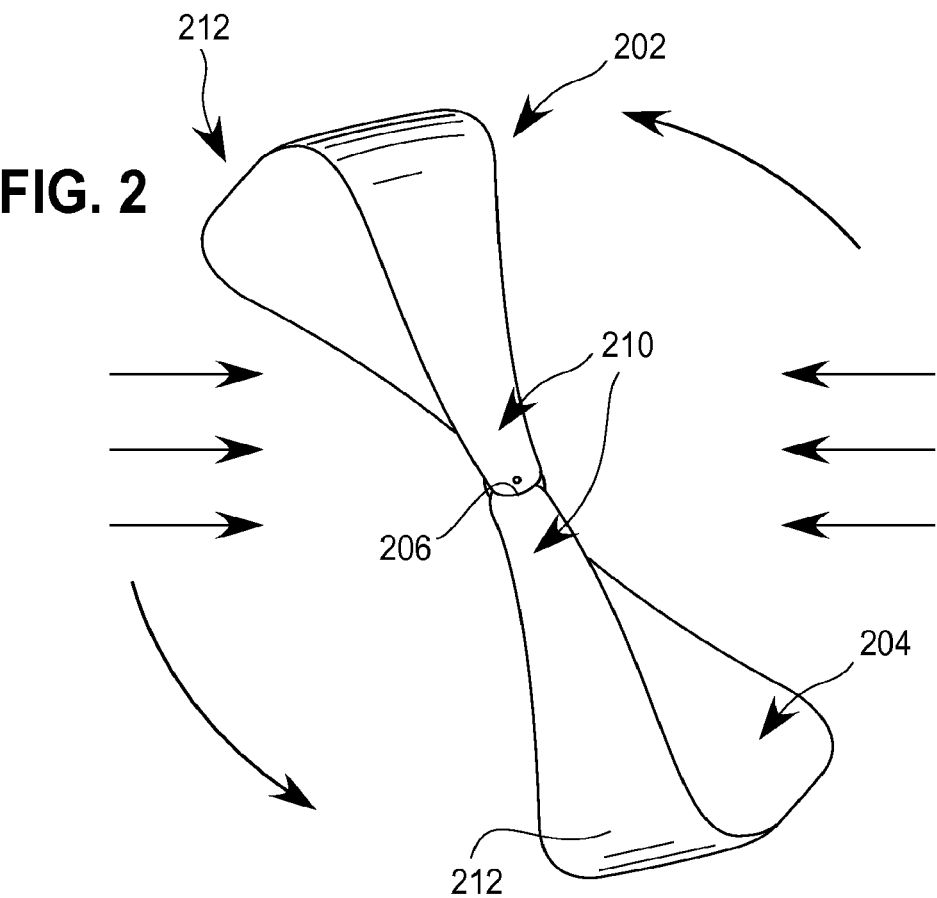
FIG. 2 is depicts a propeller with two opposing blades according to an illustrative embodiment of the invention.

FIG. 2 is a front view of a propeller according to an illustrative embodiment of the invention. This embodiment comprises two blades in loop form 202, 204, opposing one another. As used herein a "loop" defines a blade with a continuous curved surface. The propeller includes a central post 206 to which the blades are connected. The central post is coincident with the propeller's axis of rotation. It is noted that the term "post", as used herein, does not indicate a particular shape or configuration, but merely indicates a component to which blades are attached or by which they are secured to one another. In this illustrative embodiment, proximal portion 210 of each loop has a width that is less than the width of distal portions 212. An illustrative example of the ratio of widths is approximately 2:1. As drawn, the propeller spins counterclockwise as shown by the curved arrows. This creates an air flow toward the propeller center from all sides as shown for example by the triple arrows on the right and left sides of the diagram. Air also would flow into the page (front to back) for the configuration shown as the propeller spins counterclockwise.

By providing curved blades, various examples of which are shown in the figures, air flow is more directed as compared to flatter blades. Although the drawings show blades generally in the form of full loops, the blades may be curved to a lesser extent so that a closed loop is not formed, provided that the desired airflow is created.

Figure 3A:
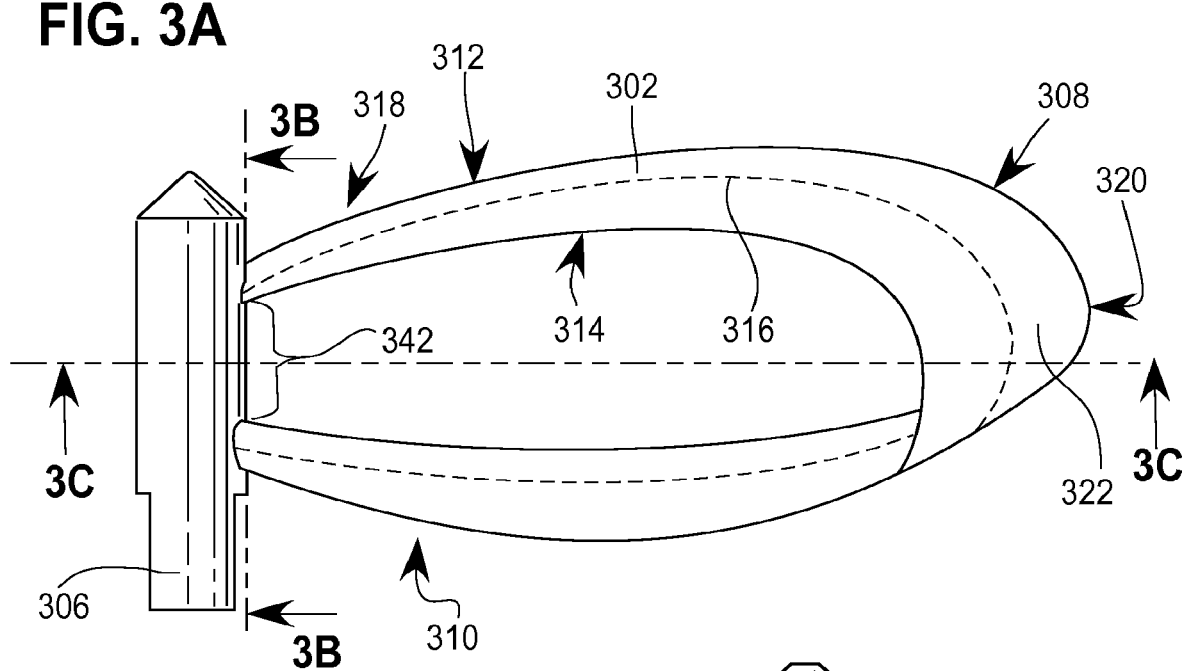
FIG. 3A is a side view of a blade in loop form according to an illustrative embodiment of the invention.

FIG. 3A depicts a looped blade according to an illustrative embodiment of the invention. FIG. 3A depicts blade 302 attached to a central post 306 of a propeller according to an illustrative embodiment of the invention. The axis of rotation of blade 302 is coincident with the longitudinal axis of central post 306 in this embodiment. Blade 302 has a top section 308 and a bottom section 310. The median line of blade 302 is defined as the locus of points midway between the blade's leading edge 312 and its trailing edge 314 as shown by the broken line 316 running from the proximal end 318 to the distal end 320 of blade 302. For some blade configurations, the median line will not be continuous from top section through side section to bottom section. The median line of blade 302 is curved providing a curved appearance to the blade sections. In other embodiments, blade sections may be cambered or otherwise curved, angular or flat, or a combination thereof. For example, FIG. 5, further discussed below, depicts an embodiment wherein blade sections.

Figure 3B:
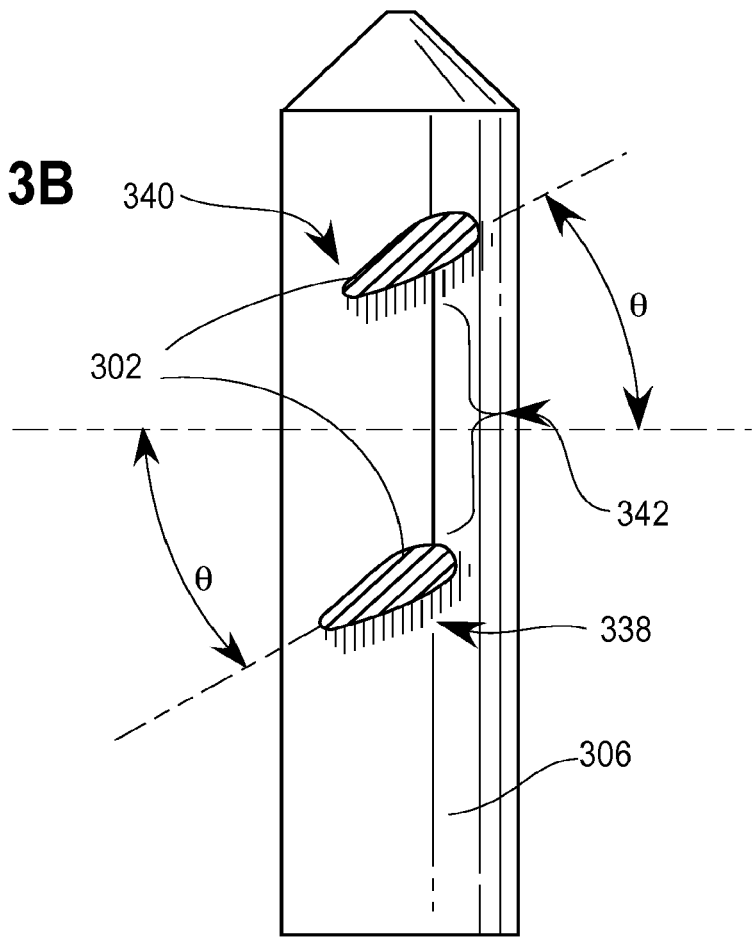

Air is compressed in the vicinity of central post 306 as the propeller spins. As seen in FIGS. 3A-3B, a gap 342 between bottom portion 310 and top portion 308 of blade 302 allows a larger volume of air to be compressed than if a gap did not exist. Air is caught on the inside surface of blade 302, thus pulling in air and creating the air flow from the sides as described above, while the outside surface of blade 302 functions to push the air toward the back of the propeller.

FIGS. 3B and 3C depict cross sections of blade 302 taken along lines B-B and C-C of FIG. 3A, respectively. Cross-section B-B shows an airfoil shape comparable to a cross section of an airplane wing. As shown in FIG. 3C, surface 332 of blade 302 is curved, while the opposing surface 330 is substantially flat. The cross section of blade 302 is tapered laterally so that at a first area 334 it is thinner than at a second, opposing area 336, also comparable to an airplane wing. Other blade configurations are within the scope of the invention and will depend in part on the desired load on the propeller.

Referring to FIG. 3B, blade 302 intersects central post 306 at a first blade intersection 338 and a second blade intersection 340. In this illustrative embodiment of the invention, first and second blade intersections 338, 340 intersect central post 306, which can be at about the same angle θ as measured counterclockwise from a line perpendicular to the longitudinal axis of central post 306, wherein the designated reference line appears as a "horizontal" line in FIG. 3B. An illustrative angle of intersection is about 25°, with an illustrative range being about 10° to about 35°. A further illustrative range of angles of intersection is about 15° to about 25°.

In exemplary embodiments of the invention the intersection angle of the bottom portion of the blade with the central post is more extreme than the angle of intersection of the top portion of the blade with the central post. Generally, angles of intersection can be in the range of about 1° to about 89°. By "extreme" it is meant more toward the vertical. An illustrative difference between the angle of intersection of the top portion of the blade as compared to the angle of intersection of the bottom portion of the blade is about 10°. An illustrative range is about 5° to about 20° and a further illustrative range is about 7° to about 15°. In a particular embodiment of the invention the angle of intersection of the top portion of the blade is about 30° and the angle of intersection of the bottom portion of the blade is about 40°. In a further embodiment of the invention, the angle of intersection of the top portion of the blade is about 75° and the angle of intersection of the bottom portion of the blade is about 85°.

Blade 302 as shown in FIGS. 3A-C exhibits a coarse blade angle, or pitch, near the axis of rotation with the pitch decreasing radially outward from the axis of rotation. Despite this downward gradient, the outermost point of the blade will still exhibit non-zero pitch. In an alternative embodiment of the invention, the blade may have a more course blade angle at the farthest point from the axis of rotation.

Figure 3E:
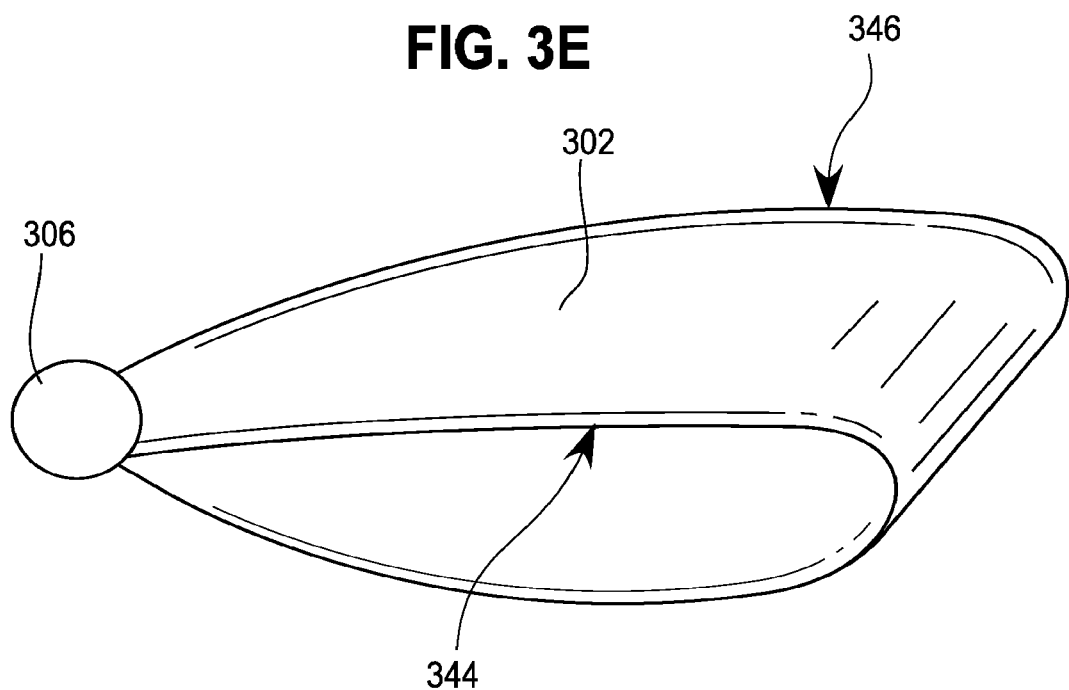

FIGS. 3D and 3E depict blade 302 as viewed so central post 306 is perpendicular to the page. In FIG. 3D blade 302 would be rotating clockwise and has a leading edge 346 and a trailing edge 344. In FIG. 3E, blade 302 would be rotating counterclockwise.

In embodiments wherein two blades oppose one another, such as blades 202 and 204 in FIG. 2, the pitches of opposing blade intersections on either side of the axis of rotation differ from each other. So for example, in FIG. 4 you have a first blade 402 having a first blade intersection 404 at angle $\theta_A$ and a second blade intersection 406 at an angle $\theta_B$, and an opposing blade 410 would have a first blade intersection angle and a second blade intersection angle of $\theta_A \pm x$ and $\theta_B \pm x$, respectively. So in other words, the pitch of opposing blade intersections differs. An illustrative difference in pitch between opposing blade intersections is about 50°, wherein for example one blade intersection has a 25° pitch and the opposing blade has an intersection with a negative 25° pitch. Differences can be equally or unequally distributed. A general range of differences between the pitch of opposing blades is about 40° to about 60°. The pitch of opposing blade intersections need not be equal from the plane of rotation as in the preceding example.

Figure 5:
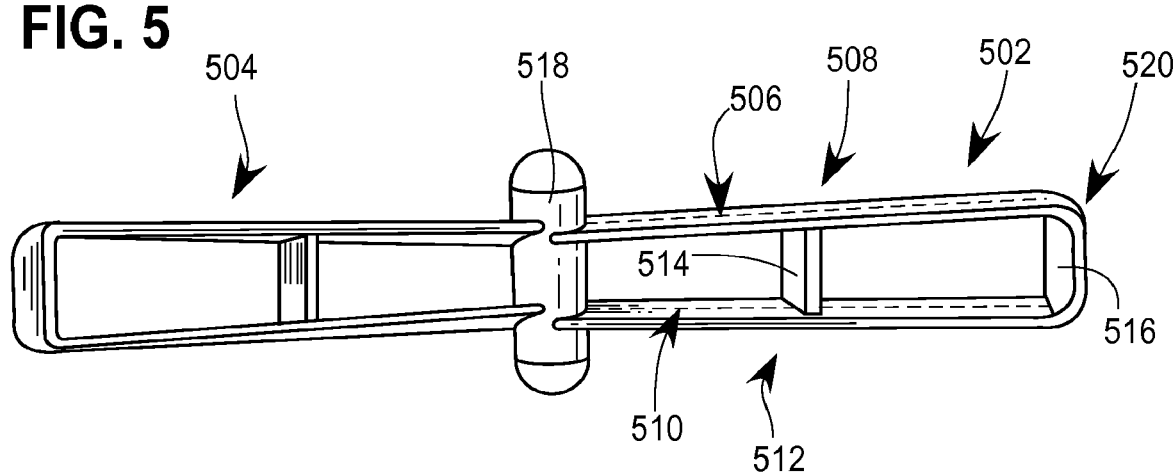
FIG. 5 depicts a propeller with uprights attaching the upper and lower blade portions according to an illustrative embodiment of the invention.

FIG. 5 depicts an illustrative embodiment that includes two blades 502, 504 with substantially non-curved median lines. Median line 506 of top blade section 508 and median line 510 of bottom blade section 512 of blade 502 are substantially linear and may or may not be parallel. Blade 504 also has a substantially linear median line. One or more substantially vertical wing segments 514, 516 connect top blade section 508 and bottom blade section 510 at intervals radiating from a central post 518 up to but not necessarily including the distal end 520 of blade 502. Blade 504 may have similar or the same vertical segments. Although, the blades are flattened to an extent and would not necessarily be considered a "loop" with a continuous surface, the desired airflow may nonetheless be created with the addition of the wing segments, 514, 516, or both. As the propeller spins, wing segments 514, 516 pull air in from the sides toward central post 518, thus creating the desired airflow.

Figure 11:
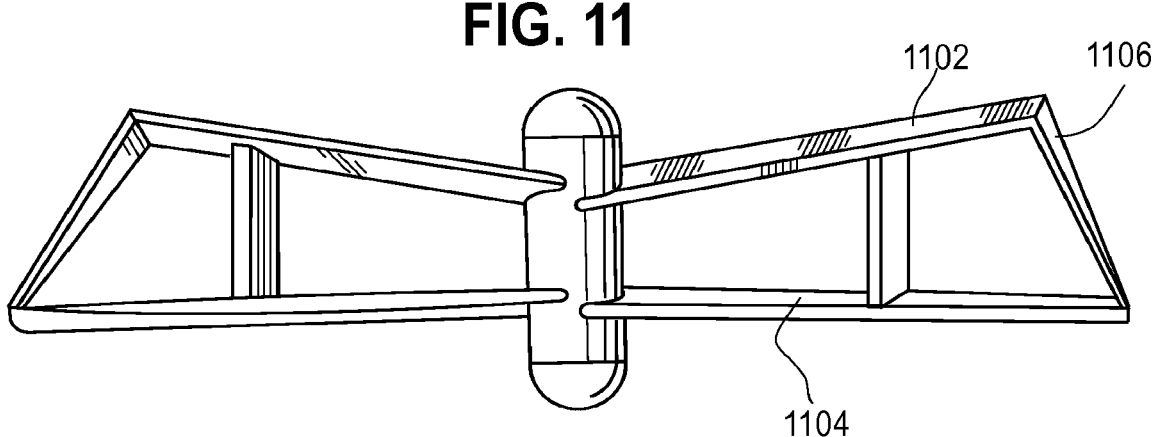
FIG. 11 depicts a propeller according to an illustrative embodiment of the invention.

In a further embodiment of the invention, such as shown in FIG. 11, top blade section 1102 and bottom blade section 1104 are not symmetrical. This can be accomplished, for example, by bottom section 1104 being longer than the top section 1102, with a side section 1106 angled toward the front of the propeller to connect to the shorter top section 1102. This can facilitate the airflow being pulled in from the side section to propel the blade forward. In general, a more extreme angle between the side section and the top section of the blade will result in more thrust and a higher forward rake for the top section of the blade.

Figure 6A:
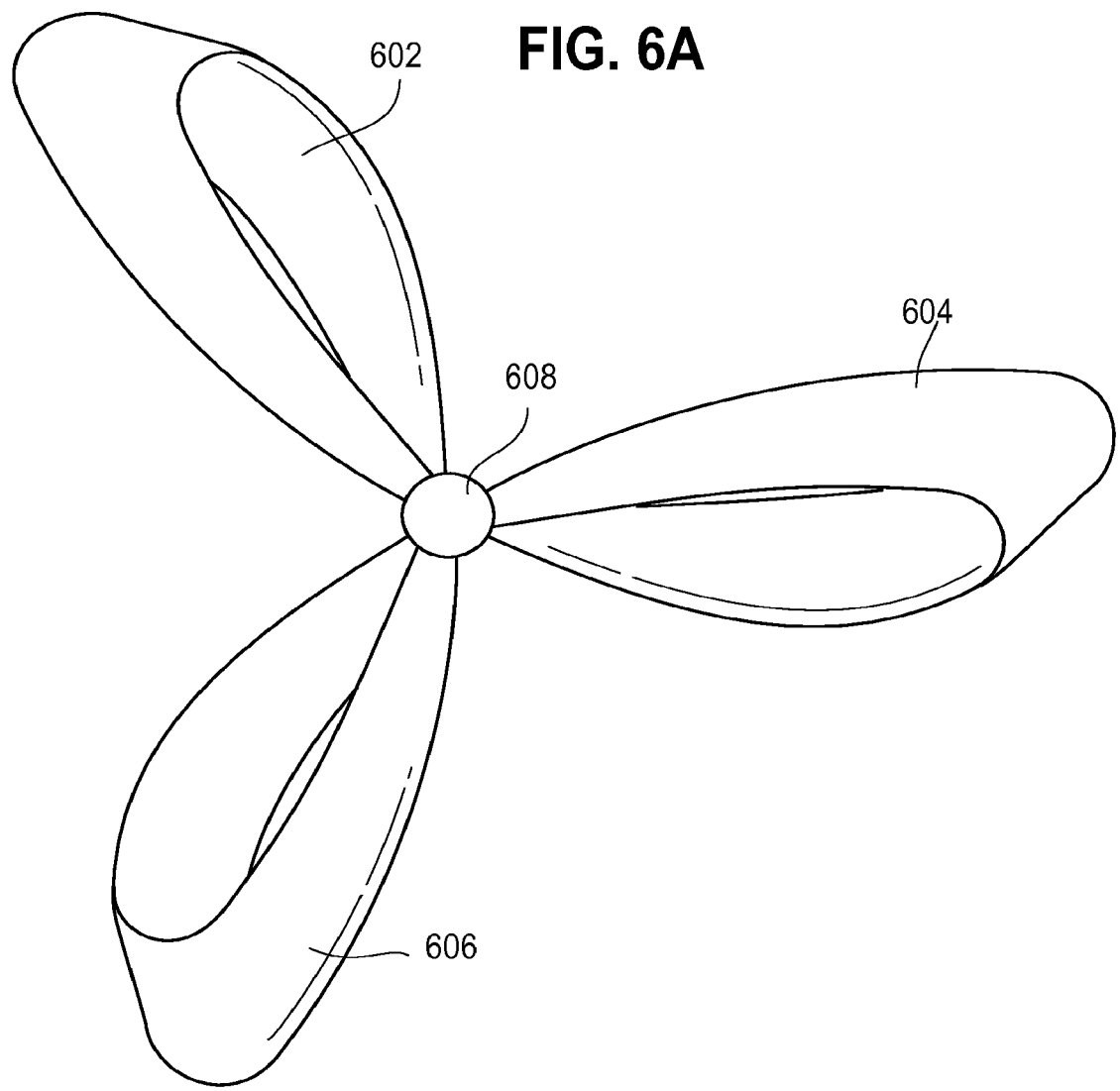
FIG. 6A shows a three-loop propeller according to an illustrative embodiment of the invention.
Figure 6B:
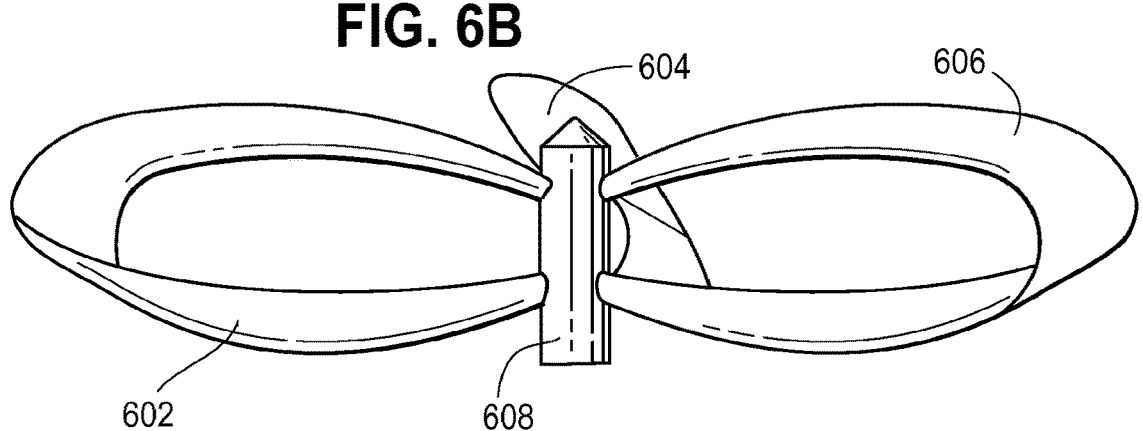
FIG. 6B depicts a side view of a three-loop propeller according to an illustrative embodiment of the invention.

FIGS. 6A and 6B show a propeller with three loop-shaped blades 602, 604, 606, according to an illustrative embodiment of the invention. FIG. 6A is a view of the propeller rotating so that counterclockwise rotation would cause airflow into the page, and FIG. 6B is a side view of the propeller. Blades 602, 604, 606 radiate from central post 608. Blades 602, 604, 606 are generally coplanar. Any number of loops can be combined to obtain the desired air flow. See for example FIGS. 7A, 7B with four blades and FIG. 8 with eight blades.

Figure 10:
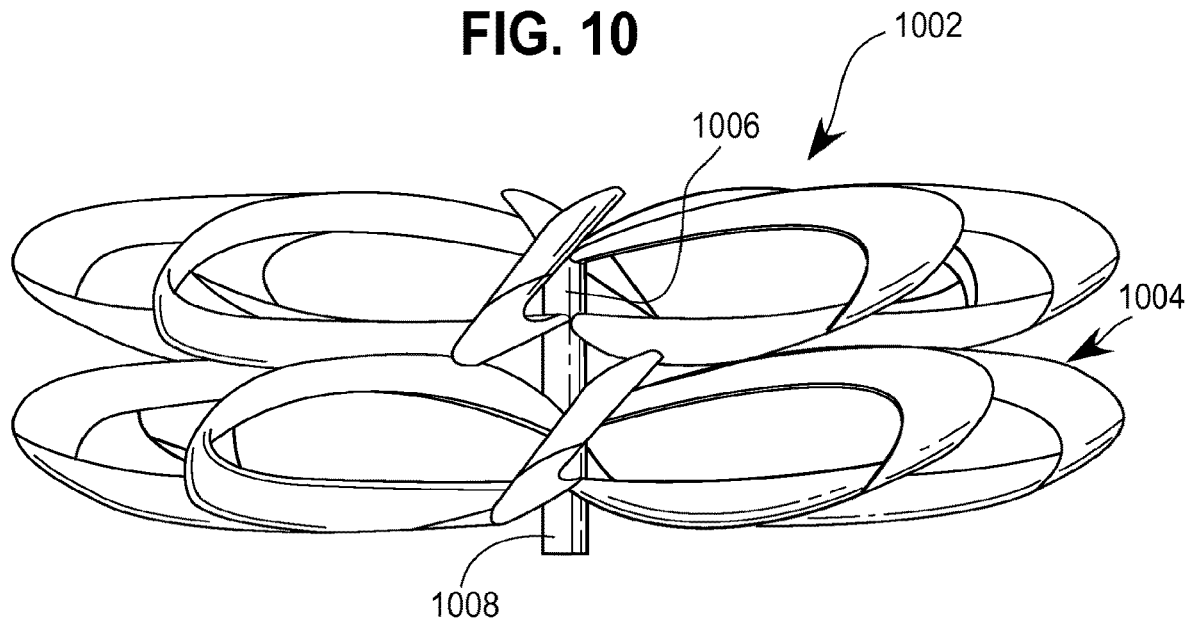
FIG. 10 is an isometric view of a stacked propeller according to an illustrative embodiment of the invention.

Propellers can be "stacked" so they rotate in different planes. By "stacked" it is not meant that they necessarily abut one another. The stacked propellers can have gaps between them. They can be of uniform size or graduated from smaller to larger in a direction perpendicular to the plane of rotation from back to front, or larger to smaller in that direction. For example, FIG. 10 shows an eight-loop propeller 1002 having a first plane of rotation stacked onto another eight-loop propeller 1004 having a second plane of rotation. The blades of propeller 1002 are attached to central post 1006, and the blades of propeller 1004 are attached to central post 1008. Although FIG. 10 illustrates two discrete central posts 1006 and 1008, propellers may also be stacked on a single central post.

Figure 12:
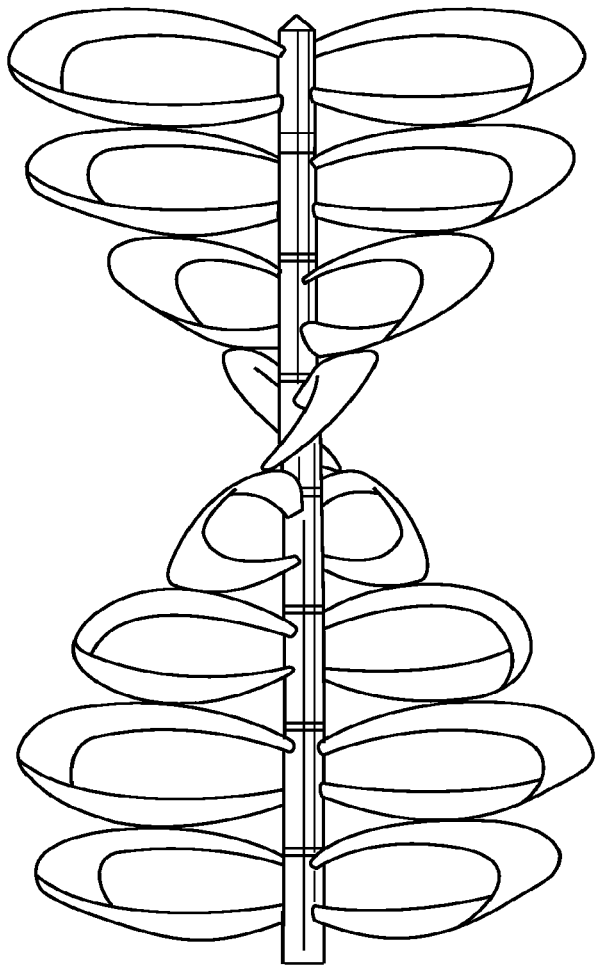
FIG. 12 depicts a stacked propeller according to an illustrative embodiment of the invention.

FIG. 12 depicts a further embodiment of a stacked propeller. Blades are disposed about a central post in a helix fashion.

Figure 7A:
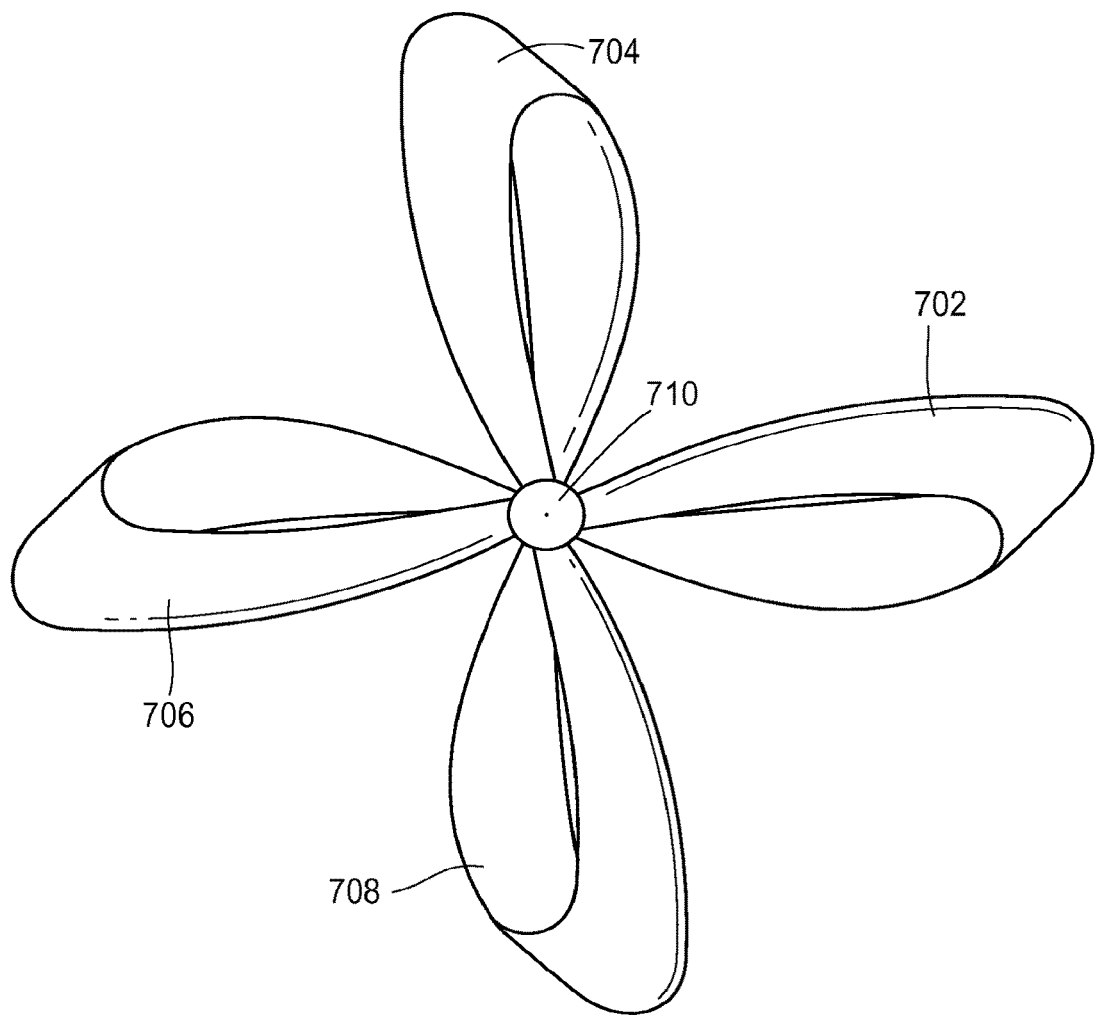
FIG. 7A depicts a four-loop propeller according to an illustrative embodiment of the invention.
Figure 7B:
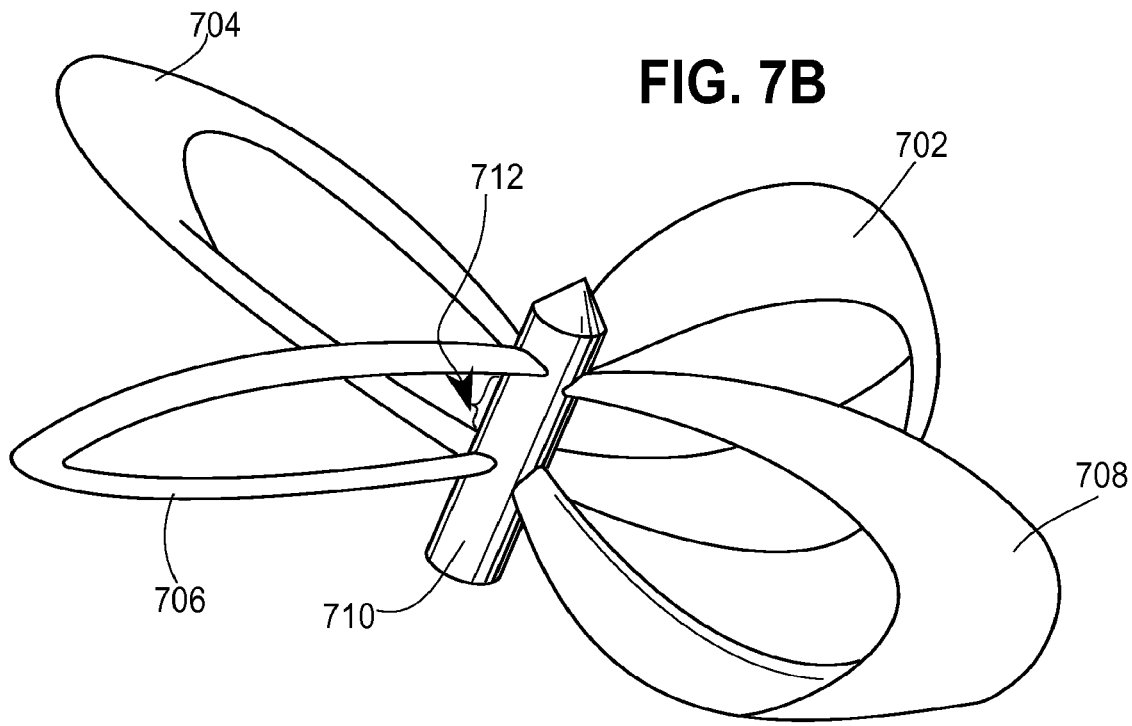
FIG. 7B is a side view of a four-loop propeller according to an illustrative embodiment of the invention.
Figure 9:
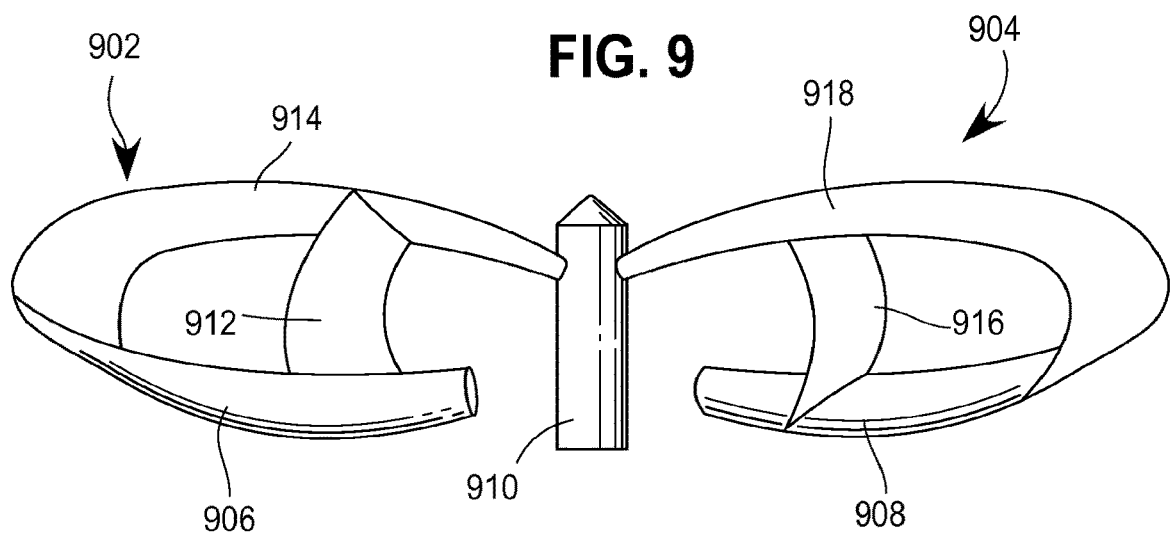
FIG. 9 is an isometric view of a two-loop propeller with unattached bottom blade sections.
Figure 13A:
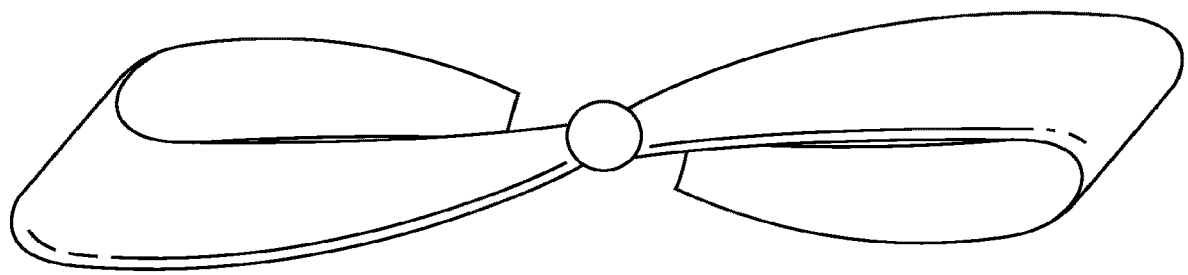
FIGS. 13A-B depict a top view and side view, respectively of a propeller with open-loop blades according to n illustrative embodiment of the invention.
Figure 13B:
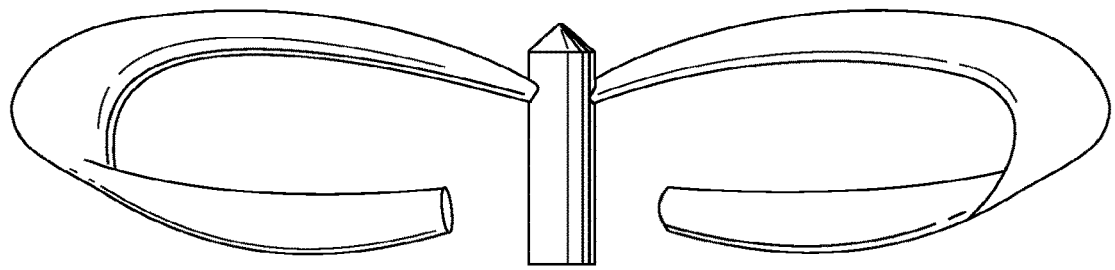

FIGS. 7A and 7B depict a propeller having four blades 702, 704, 706, 708, according to an illustrative embodiment of the invention. Blades 702, 704, 706, 708 radiate from a central post 710 wherein of blades 702, 704, 706, 708 would generally spin in the same plane as the others. As can be seen in FIG. 7B, in this illustrative embodiment, there is a "gap" 712 between the attachment locations of a top portion of each blade and a bottom portion of each blade along central post 710, with which the axis of rotation is coincident. The term "gap" is used herein to describe the space around the axis of rotation between the center of the blade intersections with a central post created when a blade's top and bottom portion are attached at different longitudinal locations along a central post or axis of rotation. FIGS. 3A-B depicts the location of the gap as shown by line 342. In certain embodiments of the invention, the blade bottom portion may not be attached to the central post, such as shown in FIGS. 9 and 13A-B, in which case the gap is the distance between the center of the top blade portion intersection with the central post and the center of where the bottom blade portion would intersect the central post if it was extended to reach it.

As the propeller spins, air is pulled towards and compressed in the vicinity of gap 712. Propellers can be designed with various gap sizes. An illustrative gap size range is approximately about 2% to 55% of the length of a propeller's. Another illustrative gap size range is about 20% of a propeller's blade length to about 35% of a propeller's blade. A third illustrative gap size range is about 30% of a propeller's blade length to about 55% of a propeller's blade length. Generally as the gap increases a larger volume of air can be compressed, thus increasing a propeller's thrust capability.

Figure 4:
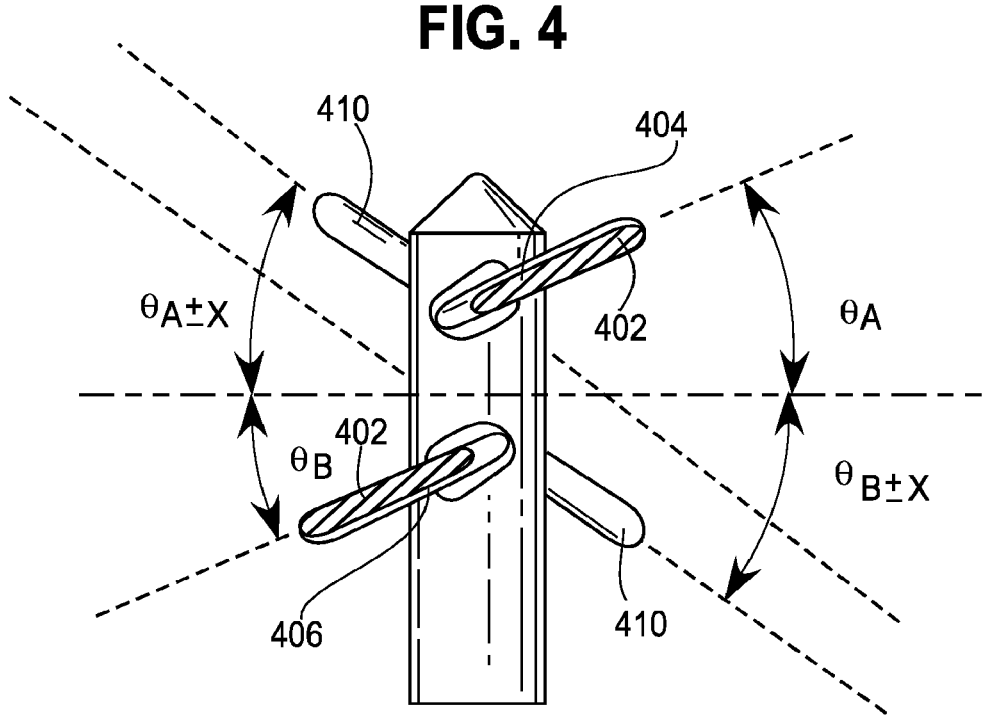
FIG. 4 is a cross-sectional view of a propeller with two opposing blades according to an illustrative embodiment of the invention.

Whether or not blades have curved or straight median lines, they may be twisted, such as about the median line for example. A twist can be seen for example in FIG. 5. Both top portion 508 and bottom portion 512 of blade 502 have an apparent twist. Curved blades can also be additionally twisted, such as can been seen in FIGS. 7A-B, or as would result from a difference in blade intersection angles θ as shown in FIG. 4. In an illustrative embodiment of the invention, the propeller has a twist forming the curvature of the blades or relative curvature of opposing blades that is approximately 35 degrees. An illustrative range of twist is in the range of about 30 degrees to about 40 degrees. Other degrees of twisting are within the scope of the invention and can create various degrees and directions of airflow.

Figure 8:
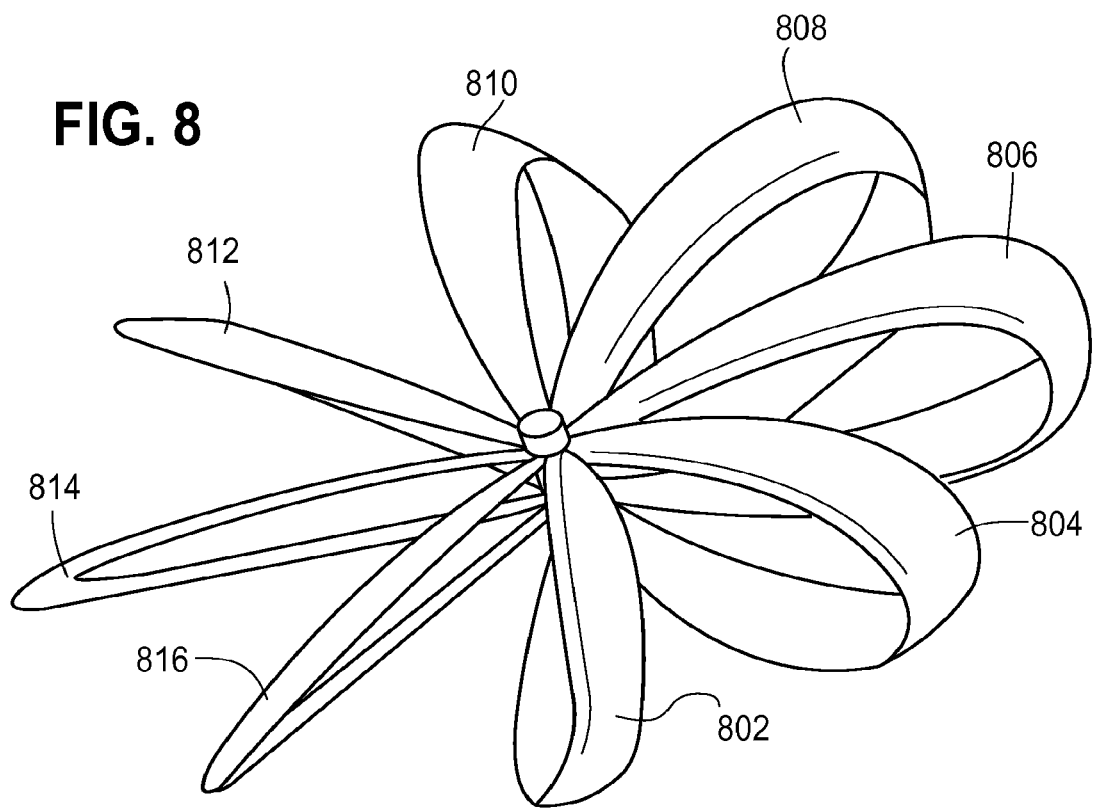
FIG. 8 shows a multiple-loop propeller according to an illustrative embodiment of the invention.

FIG. 8 depicts an illustrative embodiment of the invention with eight "blades" 802, 804, 806, 808, 810, 812, 814, 816 made of four circles that are all slightly angled but have no half turn.

In an exemplary embodiment of the invention, at least the front edges of the loops are thin to cut through the air, but other edge shapes may be beneficial to achieve a desired air flow pattern. In general, the specific shape, quantity and arrangement of the loops can be chosen to create a desired air flow pattern.

FIG. 9 depicts a propeller having blades 902, 904 in loop form opposing one another wherein the bottom blade sections 906, 908 of blades 902, 904 are not attached to central post 910. Instead, "brace" 912 flexibly couples bottom blade section bottom 906 to top blade section 914. Similarly, brace 916 flexibly couples bottom blade section 908 to top blade section 918. A "brace" as used herein is a blade component used to flexibly couple disparate blade sections. A brace can be made of steel, aluminum, composite materials such as carbon and fiber glass, or any other suitable blade material. Braces 912, 916 are angled with respect to the plane of rotation to pull air in toward the axis of rotation as the propeller rotates, thus creating drag. A brace may be angled in the same way as a blade's side section to achieve the desired air flow. Further, the thickness, length, width, and other such characteristics of a brace are designed to achieve desired operation of a particular blade application, such as by way of an example, flight. Blades 902, 904 are disposed with respect to central post 910 in this manner to provide the flexibility of adjusting their pitches. By way of illustration but not limitation, when used as a propeller in an aircraft, the braces allow for the blades 902, 904 to be manipulated to change pitch during activities such as take-off, flight, or landing. The propeller can include an adjustment mechanism to allow selectable variations in the gap formed between top blade sections 914, 918 and bottom blade sections 906, 908, respectively.

FIGS. 13A-B depict a top view and side view, respectively of a further embodiment of a propeller with open-loop blades according to an illustrative embodiment of the invention. This version does not include the braces as provided in FIG. 9.

The invention includes various devices having various embodiments of the disclosed propeller employed therein. For example, the invention includes the following illustrative devices: aircraft, watercraft, wind turbines, cooling devices, heating devices, automobile engines, and air circulation devices. The invention also includes a method of manufacturing a propeller according to any of the embodiments described, pictured or claimed herein; a method of manufacturing a device comprising any of the aforementioned propellers; a method of manufacturing a product wherein the method includes installing a device containing any of the aforementioned propellers.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications, for example, the number of blades and curvature of the blades, may be made without departing from the spirit and scope of the invention. Accordingly, it is intended that the invention not be limited to the specific illustrative embodiments, but be interpreted within the full scope of the appended claims and their equivalents.

The invention claimed is:

1. A propeller comprising:
a central post coincident with a rotational axis;
one or more separate blades each having a distal end and a proximate end, each blade having an airfoil-shaped cross section;
each of the one or more blades comprising a top section, a bottom section, and a side section, the side section disposed at or toward the distal end;
a length from the central post to the distal end of each of the one or more blade's leading edge is greater than a length from the central post to the distal end of each of the one or more blade's trailing edge such that an outermost foil of the side section is configured to pull fluid inward from the side section of the one or more blades toward the propeller rotational axis by having a non-zero blade angle, wherein the blade angle is defined as the angle between a lateral cross section of a blade and the plane of rotation;
the top section and the bottom section of each of the one or more blades connected at the proximate end to and extending radially outward from the central post;
wherein the top section extends from the central post outward to the side section at a top section distal end and the side section folds back to the central post to a bottom section distal end so a top surface of the top section becomes a bottom surface of the bottom section;
a gap between central post connections of the top section and bottom section of at least one of the one or more blades; and
the one or more blades further configured to pull fluid from a propeller front end to a propeller back end;
wherein the bottom section of the one or more blades forms a more extreme intersection angle with the central post than the top section of the one or more blades forms with the central post, wherein more extreme indicates more toward the vertical.

2. The propeller of claim 1 wherein the one or more blades are in loop form, wherein each of the one or more blades in loop form spins in a same plane of rotation as all other blades of the one or more blades in the loop.

3. The propeller of claim 1 wherein the one or more blades comprise at least one pair of blades opposing one another about the rotational axis.

4. The propeller of claim 1 wherein at least one of the one or more blades is wider at its distal end as compared to its proximate end.

5. The propeller of claim 1 wherein at least one of the blade top section, bottom section or side section of at least one of the one or more blades has a median line that is curved.

6. The propeller of claim 5 wherein each of the top section, bottom section and side section of at least one of the one or more blades is curved.

7. The propeller of claim 5 wherein a twist about the median line of the blade forming a curvature of the blades of the one or more blades is in a range of substantially 30° to substantially 40°.

8. The propeller of claim 5 wherein each blade of the one or more blades is graduated in thickness laterally across the blade.

9. The propeller of claim 8 wherein the one or more blades are graduated in width from a smaller width at the proximate end to a larger width at the distal end.

10. The propeller of claim 1 further comprising one or more additional blades disposed in stacked formation with respect to the propeller.

11. The propeller of claim 1 wherein at least the top and bottom blade sections of the one or more blades exhibit a larger pitch in the vicinity of the rotational axis and a decreasing pitch extending radially outward from the rotational axis.

12. The propeller of claim 1 wherein at least the top and bottom sections of at least one of the blades have substantially linear median lines.

13. The propeller of claim 1 wherein the top blade section of the one or more blades is not symmetrical with the bottom blade section of the one or more blades.

14. A device selected from the group consisting of an aircraft, watercraft, wind turbines, cooling devices, heating devices, automobile engines, and air circulation devices, wherein the device has at least one propeller according to claim 1.

15. A method of manufacturing a propeller comprising:
    selecting a desired direction of fluid flow;
    selecting a desired quantity of thrust;
    selecting a blade curvature, combination of blades and blade intersection angles to create the selected fluid flow and thrust; and
    creating a propeller according to claim 1 with the selected blade curvature and blade intersecting angles.

* * * * *